United States Patent [19]

Meer et al.

[11] 4,442,511

[45] Apr. 10, 1984

[54] DIGITAL OUTPUT TELEMETERING SYSTEM FOR RECORDING SEISMIC SIGNALS

[75] Inventors: Vadim V. Meer; Vladimir I. Nesterov; Boris G. Lapshin, all of Ryazan, U.S.S.R.

[73] Assignee: Ryazansky Radiotekhnichesky Institut, Ryazan, U.S.S.R.

[21] Appl. No.: 298,336

[22] Filed: Aug. 31, 1981

[51] Int. Cl.³ ............................................. G01V 1/22
[52] U.S. Cl. ........................................ 367/78; 340/853
[58] Field of Search ............. 340/852, 853, 854, 855, 340/870.13, 870.14, 870.15, 870.16, 183; 367/76, 78, 79; 364/200

[56] References Cited

U.S. PATENT DOCUMENTS

| | | | |
|---|---|---|---|
| 4,086,504 | 4/1978 | Ezell et al. | 367/79 |
| 4,112,412 | 9/1978 | Howlett | 367/79 |
| 4,137,562 | 1/1979 | Boeck et al. | 364/200 |
| 4,219,810 | 8/1980 | Joosten | 340/853 |
| 4,281,403 | 7/1981 | Siems et al. | 367/76 |
| 4,296,484 | 10/1981 | Miller | 367/79 |
| 4,301,521 | 12/1981 | Kelm | 367/78 |

OTHER PUBLICATIONS of V. B. Tsukernik, "Systemy Tsifrovoy Registraysii i obrabotki dannykh seismorazvedki", (Digital Systems for Recording and Processing Seismic Prospecting Data), Moscow, Viems, 1977, p. 5).
USSR Inventor's Certificate No. 482,748 Cl. Golv 1/28, published in the Bulletin of Discoveries, Inventions, Industrial Designs and Trademarks, No. 32 (1975).

Primary Examiner—S. C. Buczinski
Assistant Examiner—K. R. Kaiser
Attorney, Agent, or Firm—Lilling & Greenspan

[57] ABSTRACT

The digital output telemetering system for recording seismic signals comprises, according to the invention, a seismic channels commutator connected to an instantaneous automatic gain controller whose outputs are connected to an input of an analog memory and to inputs of a decoder. The latter has its two other inputs connected to a trigger output and a calibration output, respectively, of a unit for controlling a digital-analog converter. Outputs of the decoder are respectively connected to an input of an AND gate, a reset input of a counter and a second, control, input of the analog memory whose output is connected to an analog-digital converter. The latter has its output connected to an input of a receiving register whose other inputs are respectively connected to an output of a single-digit counter and an input of the decoder. The instantaneous automatic gain controller comprises two single-digit memories connected to a second input of the analog memory and to a second input of the decoder, respectively. The analog-digital converter comprises an OR gate whose output is connected to a digital input of the digital-analog converter, which serves as the calibration input. The input of the OR gate is connected to a respective output of the register.

4 Claims, 4 Drawing Figures

DIGITAL OUTPUT TELEMETERING SYSTEM FOR RECORDING SEISMIC SIGNALS

FIELD OF THE INVENTION

The present invention relates to geophysical methods of latent mass detection and, more particularly, to a digital output telemetering system for recording seismic signals.

Telemetering seismographic systems with digital outputs are employed for studying the earth's crust structure. One of their applications is an advanced method of geophysical exploration as the undersea seismic prospecting.

BACKGROUND OF THE INVENTION

The intensity of seismic signals measured in the course of seismic prospecting is dependent on the depth of beds and their physico-chemical properties, as well as on the conditions under which seismic waves are produced. The operator of a telemetering system is practically unable to adjust the equipment in accordance with seismic signal parameters, keeping in mind that the equipment is located at a distant site. This means that the dynamic range of a telemetering seismic signal recording system must be as broad as possible. The transmission of seismic signals over long communication channels must be carried out in the digital form so as to reduce the effects of noise and distortions on the results of measurements. At the same time the telemetering units of seismic signal recording equipment must be economical from the viewpoint of power input. This requirement applies both to battery and external power supply, and to meet it, today's telemetering equipment incorporates economical low-voltage circuits.

However, a lower supply voltage means a narrower dynamic range. In fact, each time the supply voltage is reduced two-fold, the dynamic range decreases by 6 db.

DESCRIPTION OF THE PRIOR ART

There is known a digital seismic signal recording system (cf. V. B. Tsukernik, "Systemy tsifrovoy registratsii i obrabotki dannykh seismorazvedki" (Digital Systems for Recording and Processing Seismic Prospecting Data"), Moscow, VIEMS, 1977, p. 5) comprising preamplifiers with filters in a number equal to that of the seismic channels. Outputs of the preamplifiers are coupled via a channels commutator to signal inputs of an automated gain controller. The latter has its output connected to a signal input of an analog-to-code converter. A second input of the automatic controller is electrically connected to a control unit whose other inputs are connected to control inputs of the analog-to-code converter and channels commutator. A digital output of the analog-to-code converter and a digital output of the control unit are connected to inputs of a receiving register whose outputs are connected to inputs of a recorder.

The transmission, conversion and recording of seismic signals within a broad dynamic range are carried out by means of binary automatic gain control which is performed by steps of 6 db and accompanied by controlling the signal level through the use of a special monitoring system coupled to the control unit. From the output of the monitoring system, logic signals are applied to a second input of the automatic gain controller to change the gain factor. The code of the automatic gain controller and the seismic signal level code are sent via the receiving register to the recorder and recorded thereby.

The time lag of the binary gain control leads to distortions of rapidly changing seismic signals. If the system under review is used as a telemetering system, each two-fold decrease of the supply voltage reduces the dynamic range by 6 db, which is equivalent to a loss of a 6 db amplification stage.

There is also known a digital output telemetering systen designed for recording seismic signals and comprising seismic pickups whose outputs are connected via seismic signal band-pass filters to inputs of a seismic channels commutator which has its output connected to an input of an amplifier incorporated in an instantaneous automatic gain controller. The controller's voltage comparator is electrically connected to the output of the amplifier and two switches contained in the instantaneous automatic gain controller. A signal input of the first switch is connected to the input of the amplifier; a signal input of the second switch is connected to the output of the amplifier; the control inputs of the two switches are electrically connected to the output of the voltage comparator; the outputs of the two switches are combined and connected to a signal input of an analog memory whose output is connected to a signal input of an analog memory whose output is connected to a signal input of a comparator incorporated in an analog-digital converter whose register has its digital outputs electrically connected to digital outputs of a digital-analog converter. The latter has its output connected to a second input of the comparator; the analog input is connected to an output of a power source of the digital-analog converter. The logic output of the comparator is connected to a control input of the register whose digital outputs are connected via a receiving register to a recorder. The control input of the analog memory is electrically connected to an input of an AND gate whose output is connected to a count input of a counter whose output is connected to a second input of the receiving register. A second input of the AND gate is electrically connected to a trigger output of the control unit of the digital-analog converter. The latter has its trigger output and setting output connected to respective inputs of the register. The setting output of the digital-analog converter is also connected to the control input of the analog memory (cf. USSR Inventor's Certificate No. 482,748, Cl. G 01 V 1/28, published in the Bulletin of Discoveries, Inventions, Industrial Designs and Trademarks, No. 32, 1975).

In the above system, the amplifier of the instantaneous automatic gain controller is electrically connected to the input of the voltage comparator via series placed amplifiers. Each of these amplifiers has its output connected via a respective switch to the point of connection of the outputs of the two main switches. The output of the comparator is electrically connected to the control inputs of all of the switches like this: it is connected to the input of the AND gate and to counters connected to inputs of AND gates in a number equal to that of the switches whose control inputs are connected to the outputs of said AND gates. The gain factor of each amplifier is selected to be equal to $2^m$, where m is an integer greater than unity. Thus the switches account for instantaneous automatic readjustment of the automatic controller's gain factor by steps of 6 db. The automatic controller's instantaneous gain factor readjustment range is 6mS db, where S is the number of amplifiers. The full dynamic range of the system amounts in (mS+n)·6 db, where n is the number of significant binary digits of the analog-digital converter's scale.

The use of low voltage for feeding electronic units of the system under review accounts for an increased noise level. This is especially so in the case of water-borne seismic survey; it must also be pointed out in this connection that hydrophones are highly sensitive to noise. Seismic filters are unable to reduce the noise level, wherefore the use of low-voltage supply sources does not make it possible to reach a sufficiently high gain factor of 6mS db. Low voltage supply normally reduces the number S of amplification stages by unity, which means that the dynamic range is narrowed by 6 m db; if the number S of amplification stages remains the same, m is reduced (m being the degree of discreetness with which the dynamic range is readjusted).

SUMMARY OF THE INVENTION

It is an object of the present invention to provide a digital output low-voltage telemetering system for recording seismic signals, operating within a broad dynamic range.

It is another object of the invention to improve the dynamic accuracy of telemetering seismic signal recording systems.

The foregoing objects are attained by providing a digital output telemetering system for recording seismic signals, comprising seismic pickups whose outputs are connected via seismic signal band-pass filters to inputs of a seismic channels commutator. The output of the seismic channels commutator is connected to an input of an amplifier incorporated in an instantaneous automatic gain controller whose voltage comparator is electrically coupled to the output of the amplifier and to two switches incorporated in said instantaneous automatic gain controller. A signal input of the first switch being connected to the input of the amplifier, while a signal input of the second switch is connected to the output of said amplifier, control inputs of the switches being electrically connected to the output of the voltage comparator, the switches' outputs being combined and connected to a signal input of an analog memory. The output of the analog memory is connected to a signal input of a comparator of an analog-digital converter whose register has its digital outputs electrically connected to digital inputs of the digital-analog converter. An output of the digital analog converter is connected to another input of the comparator, whereas its analog input is connected to an output of a power source of the digital-analog converter. The comparator has its logic output connected to the control input of the register whose digital outputs are connected via a receiving register to a recorder. A control input of the register is connected to an input of an AND gate whose output is connected to a count input of a counter whose output is connected to another input of the receiving register. A second input of the AND gate is electrically connected to a trigger output of a unit for controlling the digital-analog converter whose trigger and setting outputs are connected to respective inputs of the register, the setting output being also connected to the control input of the analog memory. According to the invention, the power source of the digital-analog converter is a calibrating current source which is connected to the output of the counter and controlled by voltage fed from that output. The telemetering system includes a decoder whose outputs are connected to the input of the AND gate having its other input connected to the logic output of the comparator, the decoder's second output being connected to the reset input of the counter whose set input is connected to the control input of the analog memory and to a second control input of said analog memory, the decoder's inputs being connected to the trigger output and calibrating output of the unit for controlling the digital-analog converter, to the control input of the switch of the instantaneous automatic gain controller and to the input of the receiving register. The analog-digital converter includes an OR gate whose output is connected to the digital input of the digital-analog converter, which serves as the calibrating input of said converter, a first input of said OR gate being connected to a respective output of the register, a second input of said OR gate being connected to that output of the decoder which is connected to the input of the AND gate. The instantaneous automatic gain controller includes two single-digit memories whereof one has its reset and set inputs connected to respective outputs of the comparator, whereas the set and reset outputs are connected to the control inputs of the respective switches and to the respective inputs of the second single-digit memory whose output is connected to the respective input of the decoder which is electrically connected to the calibrating current source and the AND and OR gates so as to provide for instantaneous automatic calibration of the analog-digital converter, recording inputs of both single-digit memories being connected to the setting and trigger outputs, respectively, of the control unit.

It is expedient that the calibrating current source should comprise a d.c. source with a shunting resistor and a switch placed in parallel with said d.c. source, the switch having its control input connected to the output of the counter, the resistance of the shunting resistor being expressed as follows:

$$r = \frac{R}{a^m - a},$$

where
R is the analog input resistance of the digital-analog converter;
a is the base of the coding system;
$a^m$ is the ratio between the calibration limits of the analog-digital converter; and
m is an integer.

It is desirable that the serial number i of the digital input of the digital-analog converter, which serves as the calibrating input, should be as follows:

$$i = \log_a \frac{k}{a^m}$$

where k is the gain factor of the instantaneous automatic gain controller, equal to the base a of the coding system, raised to an even power.

It is preferable that the analog memory should comprise a circuit composed of two resistors placed in series, one lead of said circuit being connected to an output of an operational amplifier of said analog memory and to a lead of a capacitor, the point of connection of the two resistors being connected via a switch to the inverting input of the amplifier and to a second lead of the capacitor, said point of connection of the two resistors also being grounded via another siwtch, the control inputs of the switches being connected to a set output and a reset output of a flip-flop. It is further preferable that said analog memory should contain a second circuit composed of two series-connected resistors and having one of its leads grounded, as well as a second capacitor having one of its leads connected to the grounded output of said second resistor circuit. The analog memory also includes two series-connected switches whose control inputs are connected to respective outputs of the flip-flop, one of the switches having its output grounded, whereas the output of the second switch is connected to the inverting input of the operational amplifier and to the second lead of the second capacitor, the common point of connection of the two switches being connected to the point of connection of the resistors incorporated in the second resistor circuit, the set input of the flip-flop being connected to the output of the decoder, connected to the second control input of the analog memory. The instantaneous automatic gain controller contains an inverter connected to the output of the switch, and two additional switches to commutate the inverted seismic signals, the signal input of one of the additional switches being connected to the output of the inverter, the signal input of the second switch being connected to the inverting output of the amplifier, the switches having their control inputs connected to the outputs of the first memory, the switches having their outputs combined and connected to the lead of the additional resistor circuit of the analog memory.

The introduction in the proposed seismic signal recording system of an OR gate and the provision of appropriate connections between individual units of the system make it possible to perform instantaneous automatic step-by-step calibration of the system at low seismic signal levels. The OR gate has its output connected to the digital input of the digital-analog converter, which digital input serves as the calibrating input; the input of the OR gate is connected to the respective output of the register. The power source of the digit-analog converter is d.c source with a shunting resistor and a switch placed in parallel with it; the control input of the switch is connected to the output of the counter whose count input is connected via the AND gate to the logic output of the comparator. Instantaneous automatic step-by-step calibration of the system is also made possible due to the introduction of the decoder and two single-digit memories. The serial number of that digital input of the digital-analog converter which serves as the calibrating input, and the ratio between the analog input resistance of the digital-analog converter and the resistance of the shunting resistor are selected so that the quotient of the amplifier's gain factor divided by the ratio between the instantaneous automatic calibration limits should be equal to the base of the coding system raised to the "m" power; this helps expand the dynamic range of the seismic signal recording system with one amplification stage, while reducing the supply voltage to a level of 3 to 5 volts. The use of differential circuitry in the amplifier and analog memory and the introduction of an additional inverter and additional switches expand the dynamic range of the system by 6 db and improve the dynamic accuracy; as a result, the coding of signals of each seismic channel takes less time. In combination, the above improvements account for a substantial increase of the information put through the seismic signal recording system.

BRIEF DESCRIPTION OF THE DRAWINGS

Other objects and advantages of the present invention will become more apparent from a consideration of the following detailed description of preferred embodiments thereof, taken in conjunction with the accompanying drawings, wherein.

DETAILED DESCRIPTION OF THE INVENTION

Figure 1:
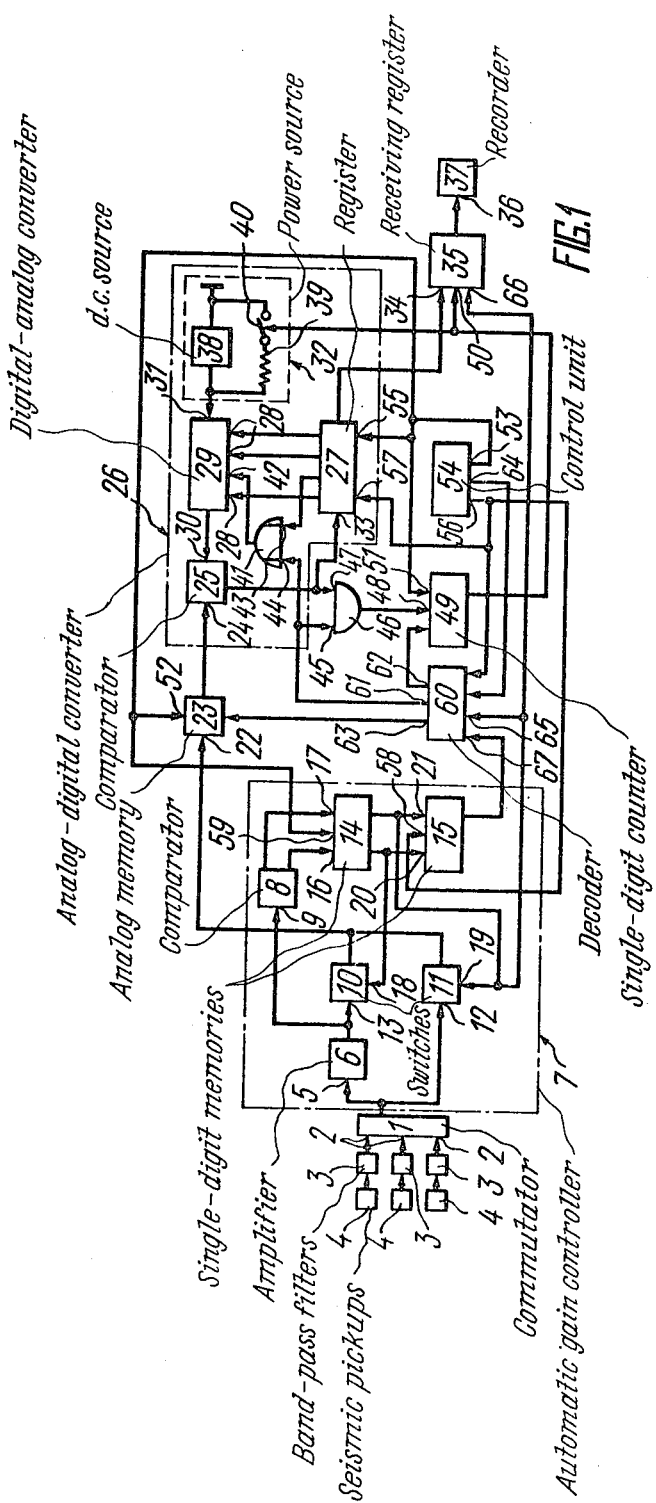
FIG. 1 is a block diagram of a digital output telemetering system for recording seismic signals, in accordance with the invention.

Referring to the accompanying drawings, the digital output telemetering system for recording seismic signals comprises, according to the invention, a seismic channels commutator 1 (FIG. 1) whose inputs 2 are connected via seismic signal band-pass filters 3 to seismic pickups 4. The number of seismic pickups 4 and filters 3 depends on the number of seismic channels; in the embodiment under review, there are three pickups 4 and three filters 3. The seismic channels commutator 1 has its output connected to an input 5 of an amplifier 6 incorporated in an instantaneous automatic gain controller 7.

The gain controller 7 further contains a voltage comparator 8 whose input 9 is connected to the output of the amplifier 6. The gain ontroller 7 then includes switches 10 and 11. A signal input 12 of the switch 11 is connected to the input 5 of the amplifier 6. A signal input 13 of the switch 10 is connected to the output of the amplifier 6. The gain controller 7 further includes two single-digit memories 14 and 15 which are both flip-flops. A reset input 16 and set input 17 of the memory 14 are connected to respective outputs of the voltage comparator 8, the last stage of which (not shown in FIG. 1) is the well-known differential circuit. The reset output and set output of the memory 14 are connected to control inputs 18 and 19, respectively, of the switches 10 and 11, respectively, as well as to a reset input 20 and set input 21, respectively, of the memory 15. The outputs of the switches 10 and 11 are combined, and their point of connection is connected to a signal input 22 of an analog memory 23.

The output of the memory 23 is connected to a signal input 24 of a comparator 25 which is part of an analog-digital converter 26. The latter also includes a register 27 whose outputs are connected to digital inputs 28 of a digital-analog converter 29. The converter 29 has its output connected to an input 30 of the comparator 25. An analog input 31 of the converter 29 is connected to the output of a power source 32 of the digital-analog converter. The logic output of the comparator 25 is connected to a control input 33 of the register 27 whose digital outputs, which serve as the output of the analog-digital converter 26, are connected to an input 34 of a receiving register 35 connected to an input 36 of a recorder 37. It is assumed that the recorder 37 is installed on board a survey ship. In the embodiment under review, the register 35 is connected to the recorder 37 by means of a twisted pair of wires or a coaxial cable contained in a floating hose (not shown in FIG. 1); this means that the recorder 37 is remote from other units of the system, which are contained in a sealed capsule. The receiving register 35 is the well-known shift register which serves to transmit signals to the recorder 37 in the form of a serial binary code (the circuits for controlling the register 35 are not shown in FIG. 1).

In the embodiment under review, the power source 32 of the digital-analog converter comprises a d.c. source 38 which comprises, in turn, field-effect transistors; these are cascade-connected, which is a generally known type of connection (cf. the journal "Pribory i technika experimenta"/"Experimental Instrumentation and Techniques"/, No. 5, 1979; N. I. Zheludkov, V. A. Kareyev and V. V. Meyer, "Kompensirovanny isotochnik toka submilliampernogo diapazona"/"Compensated Submilliampere Current Source"/, pp. 160–162). Placed in parallel with the cascade of field-effect transistors are a shunting resistor 39 and a switch 40; these are connected in series.

The analog-digital converter 26 further includes an OR gate 41 whose output is connected to the digital input of the digital-analog converter 29, which digital input serves as a calibrating input 42; an input 43 of said OR gate 41 is connected to a respective output of the register 27. A second input 44 of the OR gate 41 is connected to an input 45 of an AND gate 46 whose second input 47 is connected to the logic output of the comparator 25. The output of the AND gate 46 is connected to a count input 48 of a single-digit counter 49 whose set output is connected to an input 50 of the receiving register 35.

A set input 51 of the counter 49 is connected to a control input 52 of the analog memory 23, to a setting output 53 of a control unit 54 for controlling the analog-digital converter 26, and to a setting input 55 of the register 27. A trigger output 56 of the control unit 54 is connected to a trigger input 57 of the register 27 and to a write input 58 of the memory 15. A write input 59 of the memory 14 is connected to the setting output 53 of the control unit 54.

The seismic signal recording system according to the invention further includes a decoder 60 whose first output 61 is connected to the input 44 of the OR gate 41, which input 44 is also connected to the input 45 of the AND gate 46. A second output 62 of the decoder 60 is connected to the reset input of the counter 49. A third output 63 of the decoder 60 is connected to the second control input of the analog memory 23. Two inputs of the decoder 60 are connected to the setting output 56 and a calibrating output 64, respectively, of the unit 54 for controlling the converter 26. A third input 65 of the decoder 60 is connected to the control input 19 of the switch 11 and to an input 66 of the receiving register 35. A fourth input 67 of the decoder 60 is connected to the output of the memory 15.

Figure 2:
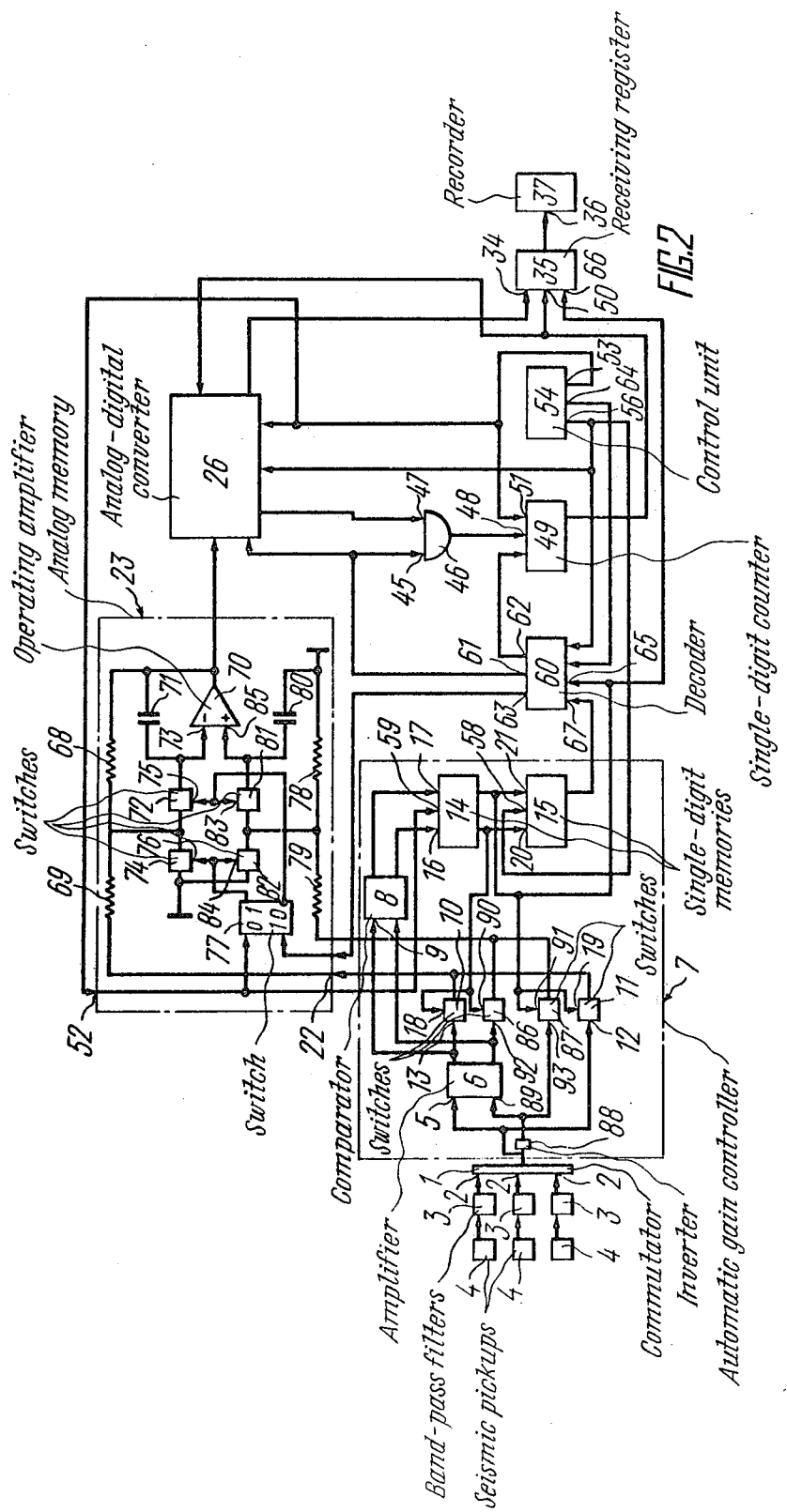
FIG. 2 is a block diagram of a digital output telemetering system for recording seismic signals, in accordance with the invention, incorporating a preferred embodiment of the instantaneous automatic gain controller and analog memory.

The serial number i of the digital input of the digital-analog converter 29, which serves as the calibrating input 42, is determined by the expression:

$$i = \log_a \frac{k}{a^m},$$

where
- a is the base of the coding system (in the embodiment under review, a=2);
- k is the gain factor of the amplifier 6, which is equal to the coding system base a raised to an even power (i.e. $k=a^{2m}$;
- $a^m$ is the ratio between the calibration limits of the analog-digital converter 26;
- m is an integer;

The resistance r of the shunting resistor 39 is derived from the formula $$r = \frac{R}{a^m - 1},$$

where R is the input resistance of the digital-analog converter 29 on the side of its analog input 31;

The analog memory 23 (FIG. 2) comprises a circuit composed of series-connected resistors 68 and 69. The lead of the resistor 69 serves as the signal input 22 of the analog memory 23. The lead of the resistor 68 is connected to the output of an operational amplifier 70 and to the lead of a capacitor 71. The point of connection of the resistors 68 and 69 is connected via a switch 72 to an inverting input 73 of the amplifier 70 and to the second lead of the capacitor 71; the point of connection of said resistors 68 and 69 is also grounded via a switch 74. Control inputs 75 and 76 of the switches 72 and 74, respectively, are connected to the set and reset outputs, respectively, of a flip-flop 77 whose reset input serves as the control input 52 of the analog memory 23.

The analog memory 23 further includes an additional circuit composed of series-connected resistors 78 and 79; one lead of this circuit is grounded. The memory 23 still further contains a capacitor 80 one of whose leads is connected to the grounded lead of the resistor 78. The memory 23 also contains two switches 81 and 82 placed in series, whose respective control inputs, 83 and 84, are connected to the respective outputs of the flip-flop 77. The output of the switch 82 is grounded; the output of the switch 81 is connected to an inverting input 85 of the operational amplifier 70 and to the lead of the capacitor 80. The output of the operational amplifier 70 serves as the output of the analog memory 23. The point of connection of the switches 81 and 82 is connected to the point of connection of the resistors 78 and 79. The set input of the flip-flop 77 serves as the second control input of the analog memory 23, which second control input is connected to the output 63 of the decoder 60.

The instantaneous automatic gain controller 7 includes two additional switches 86 and 87, whose purpose is the commutation of the inverted seismic signals. The output of the commutator 1 is connected via an inverter 88 to an inverting input 89 of the amplifier 6. The inverter 88 is an operational amplifier. Control inputs 90 and 91 of the additional switches 86 and 87, respectively, are connected to the reset output and set output, respectively, of the memory 14. Signal inputs 92 and 93 of said additional swtiches 86 and 87 are connected to the inverting output of the amplifier 6 and the output of the inverter 88, respectively. The outputs of the switches 86 and 87 are combined, and their point of connection is connected to the lead of the additional circuit, composed of the resistors 78 and 79, of the analog memory 23.

Figure 3:
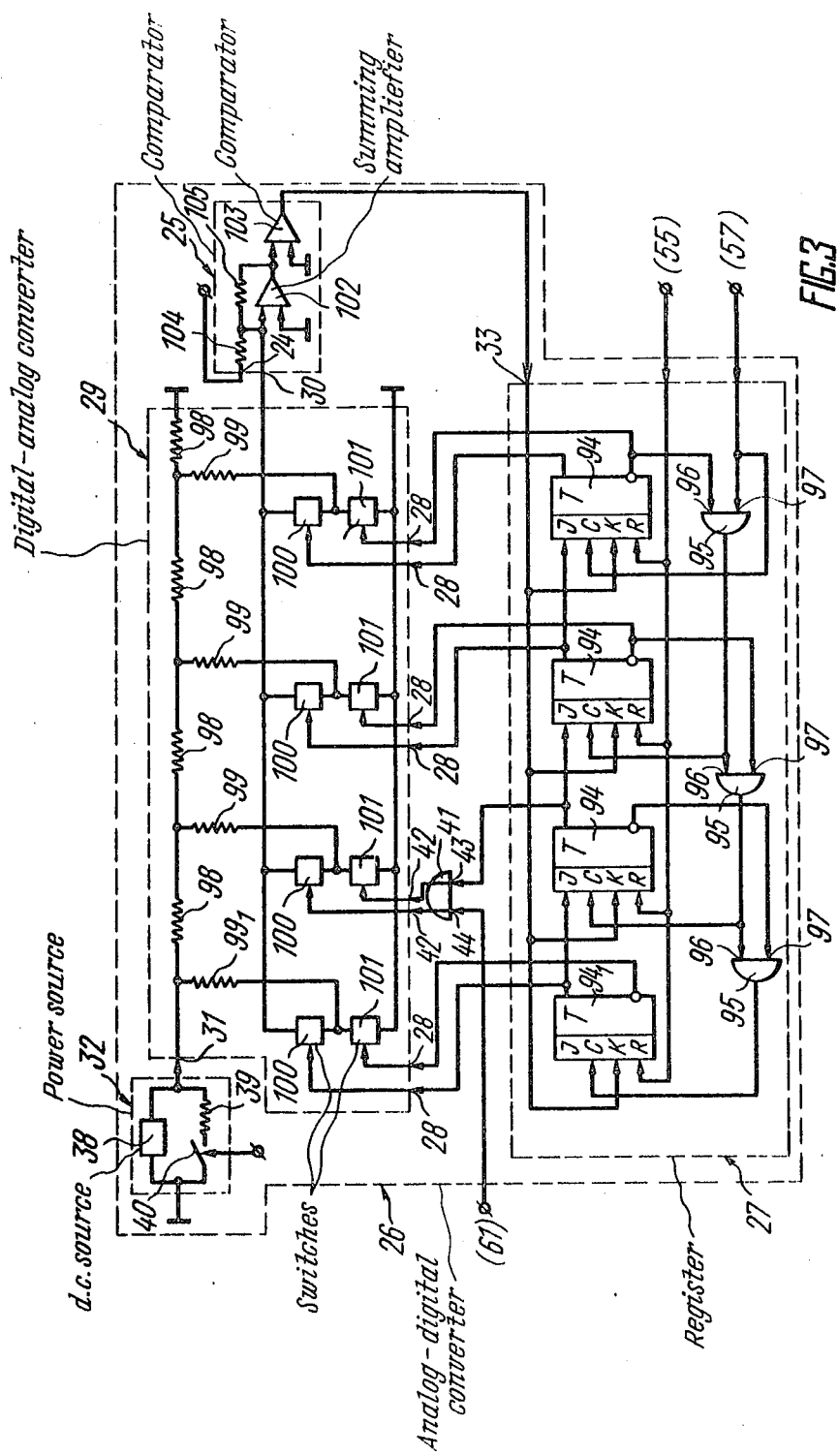
FIG. 3 is a block diagram of the analog-digital converter of the digital output telemetering system for recording seismic signals, in accordance with the invention.

In the embodiment under review, the register 27 (FIG. 3) of the analog-digital converter 26 comprises a group of flip-flops 94 in a number equal to "n" which is the number of binary code digits. The set output of each of the flip-flops 94 is connected to the J-input of the next flip-flop 94. The setting R-inputs of all the flip-flops 94 are combined, and their common point of connection is the setting input 55 of the register 27. The K-inputs of all the flip-flops 94 are also combined, and their point of connection is the control input 33 of the register 27. The register 27 contains (n-1) AND gates 95, each of which having its output connected to the C-input of the respective flip-flop 94 and to an input 96 of the next AND circuit 95 whose second input 97 is connected to the inverting output of the previous flip-flop 94. An input 97 of the first AND gate 95 is the trigger input 57 of the register 27 (cf. Proceedings of IREE, v. 34, No. 3, 1973, pp. 91-94, the article by D. A. Pucnell and J. Bartlett, entitled "The Roll-Up Register and Its Application to Analog-to-Digital Conversions").

The digital-analog converter 29 further includes a circuit composed of series-connected resistors 98. The points of connection of said resistors 98 are connected to resistors 99 whose resistance is twice as great as that of the resistors 98.

The resistors 98 and 99 make up a well-known R-2R resistor matrix which is arranged as an inverting circuit. The lead of the extreme resistor 99 is the analog input 31 of the converter 29. Connected to the lead of each resistor 99 is the point of connection of a respective pair of series-connected switches 100 and 101 whose first outputs are combined and connected to a zero bus, and whose second outputs are combined and connected to the input 30 of the comparator 25. In the embodiment under review, the comparator 25 comprises a two-input summing amplifier 102 whose output is connected to the input of a voltage comparator 103. The amplifier 102 has an input resistor 104 and is also connected to a reverse signal transmission resistor 105, the whole making up a well-known circuitry. The lead of the resistor 104 is the signal input 24 of the comparator 25. The output of the comparator 103 is connected to the input 33 of the register 27.

The control inputs of the pairs of switches 100 and 101 serve as the digital inputs 28 of the digital-analog converter 29 and are connected to the set and reset outputs of the respective flip-flops 94 of the register 27.

The control inputs of the pairs of switches 100 and 101, which serve as the calibrating input 42, are connected to the direct and inverse outputs of the AND gate 41 whose input 43 is connected to the set output of the respective flip-flop 94 of the register 27, while its input 44 serves to receive the calibration signal arriving from the output 61 of the decoder 60.

All the switches of the embodiment described here are built of field-effect transistors. The circuits responsive to the sign of the seismic signal are invariant to the structure of the system under review and are therefore not shown in the attached drawings.

Figure 4:
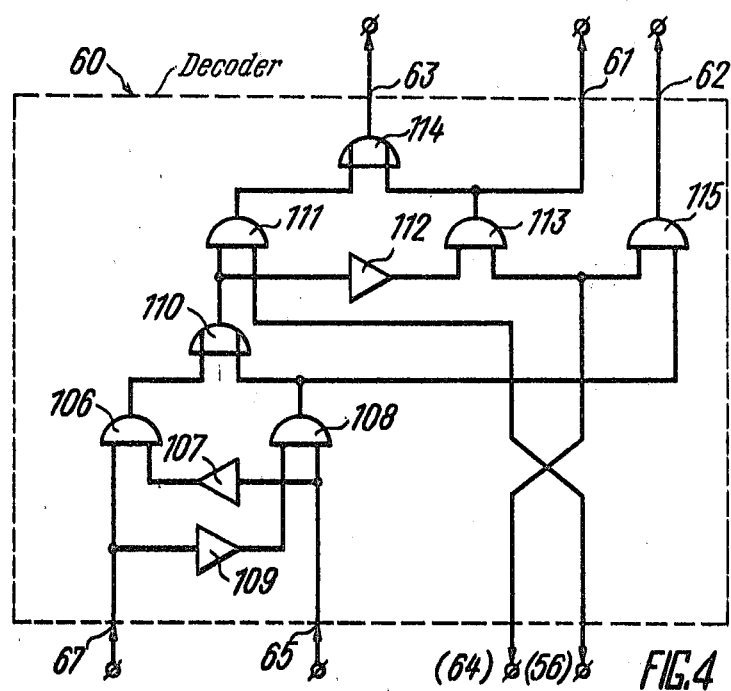
FIG. 4 is a block diagram of the decoder of the digital output telemetering system for recording seismic signals, in accordance with the invention.

In the embodiment under review, the decoder 60 (FIG. 4) performs the following switching functions:

$$P_1 = D(A\bar{B} \vee \bar{A}B) V P_2$$

$$P_2 = C(A\bar{B} \vee \bar{A}B)$$

$$P_3 = \bar{A}BC,$$

where
- $P_1$ is the binary signal across the output 63 of the decoder 60;
- $P_2$ is the binary signal across the output 61 of the decoder 60;
- $P_3$ is the binary signal across the output 62 of the decoder 60;
- A is the binary signal across the input 67 of the decoder 60;
- B is the binary signal across the input 65 of the decoder 60;
- C is the binary signal across the output 64 of the control unit 54;
- D is the binary signal across the output 56 of the control unit 54.

For the performance of the above functions, the decoder 60 is provided with an AND gate 106 whose first input is the input 67 of the decoder 60, and its second input is connected via a logic inverter 107 to the input of another AND gate 108, which latter input is the input 65 of the decoder 60. A second input of the AND gate 108 is connected via a logic inverter 109 to the input of the AND gate 106, which is the input 67 of the decoder 60. The outputs of the AND gates 106 and 108 are connected to inputs of an OR gate 110 whose output is connected to a first input of an AND gate 111 whose second input is connected to the output 56 of the control unit 54. The output of the OR gate 110 is connected via a logic inverter 112 to a first input of an AND gate 113 whose second input is connected to the output 65 of the control unit 54. The outputs of the AND gates 111 and 113 are connected to inputs of an OR gate 114 whose output is the output 63 of the decoder 60. The output of the AND gate 113 is the output 61 of the decoder 60. The decoder 60 further includes an AND gate 115 whose output is the output 62 of said decoder 60, while its inputs are connected to the output of the AND gate 108 and the output 64 of the control unit 54.

The digital output telemetering system for recording seismic signals in accordance with the present invention operates as follows.

Signals received by the seismic pickups 4 (FIG. 1) are passed through the band-pass filters 3 and applied to the inputs 2 of the seismic channels commutator 1 which commutates low-level signals. The commutator 1 connects, sequentially and cyclically, the seismic channels to the input of the instantaneous automatic gain controller 7. From the output of the commutator 1, the signal is applied to the input 5 of the amplifier 6; following an $a^{2m}$ voltage amplification, the signal is applied to the input 9 of the voltage comparator 8 whose output logic signals are applied to the setting inputs of the single-digit memory 14 which is a flip-flop (a=2, and m=1, 2, 3 . . . , i.e. a natural number).

For further conversions of the seismic signal, three pulses are produced by the control unit 54 during each work cycle. The first is a setting pulse produced at the output 53 of said control unit 54; the setting pulse is followed by a calibrating pulse produced at the output 64; then comes a train of trigger pulses produced at the output 56; the number of trigger pulses is equal to the number of the digits. The signal at the input 9 of the voltage comparator 8 is compared to a certain standard level, and the result of the comparison is produced at the outputs of the voltage comparator 8 in the form of a binary signal. As a result, the setting pulse is applied from the output 53 of the control unit 54 to the input 59 of the memory 14 and thus enters in said memory 14 the current state of the comparator 8. The output signals of the memory 14 reverse the state of the switches 10 and 11; as a result, at the point of connection of the outputs of said switches 10 and 11 there is produced a signal whose gain factor is equal either to 1 or $a^{2m}$. At the same time the pulse from the output 53 is applied to the control input 52 of the analog memory 23, whereafter the latter starts working on the analog signal that has arrived at the input 22. During the period of time between the arrival of the setting pulse from the output 53 and the trigger pulse from the output 56 of the control unit 54, the memory 15 stores the state of the memory 14 during the preceding work cycle. Depending upon the code combination stored in the memories 14 and 15, a number of the system's units automatically adapt themselves to the level of the seismic signal. These units include the analog memory 23, analog-digital converter 26 and counter 49. With the memories 14 and 15 being in an equal state, i.e. with "00" or "11" combinations, the current value of the seismic signal is far from the operation threshold of the comparator 8.

The decoder 60 uses the set outputs of the memories 14 and 15 with due regard for the signals applied to its inputs 65 and 67; it also uses the calibrating and setting signals arriving from the outputs 64 and 56, respectively, of the control unit 54; as a result, the decoder 60 produces three pulse signals, $P_1$, $P_2$ and $P_3$, at the outputs 63, 61 and 62, respectively. During the conversion cycle, there may be no pulses at the outputs 61 and 62; there also may be a situation when a pulse is present, say, across the output 61, in which case there is no pulse at the output 62, and vice versa. At a moment a calibrating pulse is applied from the output 64 to the decoder 60, at the output 63 there is produced a pulse which brings the analog memory 23 to the voltage storage mode.

The unit setting pulse is applied from the output 53 to the input 52 of the control unit 54 (FIG. 2) and brings the flip-flop 77 to a state during which the switches 72 and 81 are on, whereas the switches 74 and 82 are cut off. Meanwhile, the resistor circuits 69, 68 and 79, 78 are connected to the inputs 73 and 85 of the operational amplifier 70 to transmit the analog signal from the controller 7. The charging of the capacitors 71 and 80 is accompanied by the processing of the analog signal. Upon the arrival of a pulse from the output 63 of the decoder 60, the state of the flip-flop 77 is reversed so that the switches 72 and 81 are brought to their "on" state, while the switches 74 and 82 are cut off. As this takes place, the amplifier 70 is brought to the storage mode; its output voltage corresponds to the difference of voltages across the capacitors 71 and 80 at the moment of the arrival of a pulse from the output 63.

As a pulse is produced at the output 63 of the decoder 60 and with the states "00" and "11" of the memories 14 and 15, a unit pulse is produced at the output 61. This pulse is applied to the input of the OR gate 41 and proceeds via said OR gate 41 to the digital input 42 of the respective switch 100 (FIG. 3) of the digital-analog converter 29 (FIG. 1). The pulse across the output 61 accounts for an instantaneous step-by-step automatic calibration of the analog-digital converter 26.

The stored voltage is applied from the output of the analog memory 23 to the comparator 25 to be converted by the resistor 104, which is placed at the input of the operational amplifier 102, to an equivalent current. This current is alternately compared to the currents of the standard binary-weighted currents scale, which are passed through the resistors 99 and periodically applied by the switches 100 to the input 30 of the operational amplifier of the comparator 25. Following the application of the setting pulse to the input 55, all the flip-flops 94 of the register 27 are reset, and the switch 39 is cut off, because the same setting pulse resets the counter 49 (FIG. 1). At this moment all the switches 100 are off, whereas the switches 101 are brought to their "on" state by logic signals arriving from the flip-flops 94.

As a pulse is applied to the input 44 of the OR gate 41, signals are applied to the inputs 42 of the respective pair of switches 100 and 101; as a result, the switch 100 is cut off, while the switch 101 is brought to its "on" state. The standard current, which flows through the resistor 99 and amounts to a $2^i$-th fraction of the current supplied by the d.c. source 38, is applied to the input 30 of the amplifier 102 incorporated in the comparator 25; the standard current is subtracted from the current passed through the resistor 105. The result of the subtraction is determined by the signal sign comparator 103; as this takes place, none of the flip-flops 94 of the register 27 is set.

If the absolute value of the current flowing through the resistor 104 is greater than or equal to that of the standard current, a naught signal is produced at the logic output of the comparator 25; if the absolute value of the current flowing through the resistor 104 is lower than that of the standard current, a "1" signal is produced at the logic output of said comparator 25. In the former case, the pulse applied from the output 61 to the input 45 of the AND gate 46 does not reach the output of said AND gate 46, and the counter 49 remains reset; the switch 40 is off and there is no current through the shunting resistor 39. In the latter case, the pulse from the output 61 is applied via the AND gate 46 to the counter 49 and sets that counter; the switch 40 is now on, and part of the current supplied by the d.c. source 38 is passed through the shunting resistor 39.

The lead of each resistor 99 (FIG. 3) is grounded through a respective pair of switches 100 and 101; hence, the input resistance of the digital-analog converter 29 is constant on the side of its analog input 31 and equal to the resistance R of the resistor 98. The resistance r of the shunting resistor 40 is selected so as to ensure a $2^m$-fold reduction of the voltage applied by the d.c. source 38 to the input 31 of the converter 29. Thus the switching on of the switch 39 reduces the quantization step of the analog-digital converter 26 $2^m$ times; the result is an instantaneous step-by-step calibration with due regard for the level of the seismic signal at the output of the analog memory 23. The relationship between the number i of the calibration digit, the gain factor of the amplifier 6 and the resistancies R and r is determined by this equation:

$$i = \log_a \frac{K}{a^m} = \log_a \frac{K}{R/r + 1}$$

The code combination "01" or "10" in the single-digit memories 14 and 15 means that the comparator 8 has been actuated during the two preceding cycles. The great gain factor $K = a^{2m}$ of the amplifier 6 leads to a sharp increase of the seismic signal level at the input 22 of the analog memory 23, which means that more time is required for the processing of the signal. At the same time the limited frequency spectrum and limited rate of increase of the seismic signal's magnitude make it possible to unambiguously predict the state of the counter 49 for the code combinations "01" or "10" of the memories 14 and 15. The state of the counter 49 is the logic inversion of the state of the flip-flop around which the memory 15 is built. With code combinations "10" and "01" of the states of the memories 14 and 15, the decoder 60 produces no pulse at the output 61; a pulse is produced at the output 63 only after the analog-digital converter 26 is triggered; this accounts for an expanded time interval during which the signal is processed by the analog memory 23. A pulse is produced at the output 62 only with the "10" code combination; this pulse sets the counter 49. With the code combination "01" at the outputs of the memories 14 and 15, there is no pulse at the output 62 of the decoder 60, because the counter 49 is reset by the setting pulse arriving from the output 53 of the control unit 54 and applied to the zero input 51.

If at least one trigger pulse is applied from the output 56 of the control unit 54 to the input 57 of the analog-digital converter 26, there starts the process of coding the seismic signal selection, the appropriate signal being applied to the input 24 of the comparator 25 from the output of the analog memory 23.

Prior to the coding and with the arrival of a setting pulse at the input 55, all the flip-flops 94 of the register 27 are reset through their R-inputs. Meanwhile, the zero outputs of the flip-flops 94 are in the "1" state, and the pulse from the output 57 is passed through all the AND gates 95 to the count C-inputs of all the flip-flops 94. However, the first pulse at the input 57 sets only the last flip-flop $94_1$ whose J-input is free; the other flip-flops 94 are cut off by the "0" state of the outputs of all the preceding flip-flops 94. The setting of the extreme flip-flop $94_1$ is prepared by the next flip-flop 94; the setting of this flip-flop is effected by the second pulse at the input 57. The last flip-flop $94_1$ may be reset by a second pulse arriving at its C-input, but this depends on the result of a comparison of the current flowing through the resistor 104 with the maximum standard current flowing through the extreme resistor $99_1$ which is connected to the input 30 of the comparator 25 by the switch 100 when the "1" and "0" states are transmitted from the outputs of the extreme flip-flop $94_1$ to the respective inputs 28. The result of the comparison is applied from the output of the sign comparator 103 to the K-inputs of all the flip-flops 94. With a low level of the signal across the K-input, the pulse at the C-input is unable to reverse the state of the flip-flop 94, although the state of the flip-flop is indeed reversed with a high level of the signal across the K-input. The foregoing process of controlling the flip-flops 94 of the register 27 makes it possible to code the seismic signal selection voltage in accordance with the well-known principle of digit-by-digit balancing.

The signals from the main outputs of all the "n" flip-flops 94 of the register 27 (FIG. 1) are applied to the input 34 of the receiving register 35; applied to the input 66 and 50 of said receiving register 35 are signals from the outputs of the flip-flop of the single-digit memory 14 and counter 49, which correspond to the code of four subranges of the seismic signal recording system, with a 2m difference between them. This corresponds, in turn, to the dynamic range of (n+3m)·6 db with the amplification of the amplifier 6 being equal to $2^{2m}$ or (2m·6) db.

From the output of the receiving register 35, the significant (m+n) binary code digits are applied successively, digit by digit, through a radio channel or a wire communication channel to the input 36 of the recorder 37 installed on board a geophysical survey vessel.

The digital output telemetering system according to the invention, designed for recording seismic signals, features a broader dynamic range, a greater accuracy and a lower supply voltage than the existing systems. These improvements are attained as follows. The additional inverter 88 converts the signal arriving from the output of the commutator 1 (FIG. 2) to a phase reversal signal. The direct and phase reversal signals are applied to the inputs 5 and 89 of the amplifier 6; there follows a paraphase amplification of these signals; this is done with a low-voltage power supply and with a lower level of distortions. The transmission of logic signals from the outputs of the memory 14 to the control inputs 18, 90 and 19, 91 of the respective switches 10, 86 and 11, 87 makes it possible to commutate the direct and phase reversal signals and then apply them to them to the inputs of the resistor circuits 69, 68 and 79, 78 of the analog memory 23. Switching surges, which are due to the penetration of a part of the control pulse through the capacitances of the electronic switches 10, 11, 72, 81, 86 and 87, especially those of them that are built around field-effect transistors, become significantly lower, because the pairs of switches 10, 86, 11, 87 and 72, 81 are controlled by a common signal which accounts for noise of a cophasal nature. This noise is effectively suppressed due to the differential input 73, 85 of the operational amplifier 70, which is of utmost importance for the commutation of low-level signals.

The noise immunity of the system according to the invention is 2 to 3 times higher than that of conventional systems. At the same time the system of this invention makes it possible to cut down the duration of transient processes in the analog memory 23, which means faster conversion and a higher information throughput of the system.

What is claimed is:

1. A digital output telemetering system for recording seismic signals, comprising:

a group of seismic pickups each of which having an output;

a group of seismic signal band-pass filters in a number equal to the number of said seismic pickups, each of said filters having an output, and an input connected to said output of a respective seismic pickup;

a seismic channels commutator having inputs in a number equal to the number of said seismic signal band-pass filters, and an output, said inputs of said seismic channels commutator being connected to respective outputs of said seismic signal band-pass filters;

an instantaneous automatic gain controller having an input connected to said output of said commutator, said instantaneous automatic gain controller comprising: an amplifier having an input and an output, said input being connected to said output of said seismic channels commutator; a voltage comparator having an input, a set output and a reset output, said input being connected to said output of said amplifier; a first switch having a signal input, a control input and an output, said signal input being connected to said output of said amplifier; a second switch having a signal input, a control input and an output, said signal input being connected to said output of said seismic channels commutator; a first single-digit memory having a set input, a reset input, a write input, a reset output and a set output, said reset and set inputs being respectively connected to said reset and set outputs of said voltage comparator, said reset output being connected to said control input of said first switch, and said set output being connected to said control input of said second switch; a second single-digit memory having a reset input, a set input, a write input, and an output, said reset and set inputs being respectively connected to said reset and set outputs of said first single-digit memory;

an analog memory having a signal input, a first control input, a second control input, and an output, said signal input being connected to said output of said first switch and to said output of said second switch, said first control input being connected to said write input of said first single-digit memory;

an analog-digital converter comprising: a comparator having a signal input, an input and a logic output, said signal input being connected to said output of said analog memory; a digital-analog converter having digital inputs, a calibrating input, an analog input, and an output, said output being connected to said input of said comparator; a calibrating current source serving as a power source of the digital-analog converter and having a control input and an output, said output being connected to said analog input of said digital-analog converter; a register having a trigger input, a setting input, a control input connected to said logic output of said comparator, and a group of digital outputs which are connected to respective digital inputs of said digital-analog converter; an OR gate having a first input, a second input, and an output, said first input being connected to a digital output of said group of digital outputs of said register, said output being connected to said calibrating input of said digital-analog converter;

an AND gate having a first input, a second input, and an output, said first input being connected to said second input of said OR gate, said second input of said AND gate being connected to said logic output of said comparator;

a counter having a count input, a reset input, a set input, and an output, said count input being connected to said output of said AND gate, said output of said counter being connected to said control input of said calibrating current source for effecting instantaneous automatic calibration of said analog-digital converter;

a control unit for controlling said digital-analog converter, having a trigger output, a setting output and a calibrating output, said trigger output being connected to said trigger input of said register and to said write input of said second single-digit memory, said setting output being connected to said setting input of said register and to said first control input of said analog memory, said set input of said counter, and said write input of said first single-digit memory;

a decoder having a first input, a second input, a third input, a fourth input, a first output, a second output, and a third output, said first input being connected to said output of said second memory, said second input being connected to said set output of said first single-digit memory, said third input being connected to said calibrating output of said control unit, said fourth input being connected to said trigger output of said control unit, said first output being connected to said second control input of said analog memory, said second output being connected to said first input of said AND gate and said second input of said OR gate, said third output being connected to said reset input of said counter;

a receiving register having a first input, a second input, a third input, and an output, said first input being connected to said digital outputs of said register, said second input being connected to said output of said counter, said third input being connected to said set output of said first signal-digit memory; and a recorder having an input connected to said output of said receiving register.

2. A telemetering system as claimed in claim 1, wherein said calibrating current source comprises:

a d.c. source having a grounded lead and an output which serves as the output of the power source of the digital-analog converter;

a shunting resistor placed in parallel with said d.c. source, the resistance of said shunting resistor being determined by the equation:

$$r = \frac{R}{a^m - 1},$$

where

R is the input resistance of said digital-analog converter on the side of its analog input;

$a^m$ is the ratio between the calibration limits of said analog-digital converter;

a is the base of the coding system; and m is an integer; and a switch placed in series with said shunting resistor and having a control input connected to said output of said counter.

3. A telemetering system as claimed in claim 2, wherein the serial number i of said calibrating input of said digital-analog converter is determined by the following expression:

$$i = \log_a \frac{K}{a^m},$$

where k is the gain factor of said instantaneous automatic gain controller, equal to the base "a" of the coding system, raised to an even power.

4. A telemetering system as claimed in claim 1, wherein said analog memory comprises:

a first circuit composed of two series-connected resistors, having two leads;

an operational amplifier having a first input, a second input, and an output, said output being connected to one of said leads of said first circuit;

a capacitor having first and second leads, the first lead being connected to said lead of said first circuit, said second lead of said capacitor being connected to said first input of said operational amplifier;

a first switch having a control input, a first lead and a second lead, said first lead being connected to said first input of said operational amplifier, a common point of connection of the leads of said two resistors of said first circuit connected to said second lead of said first switch;

a second switch having a control input, a first lead and a second lead, said first lead being connected to said second lead of said first switch;

a second circuit composed of two series-connected resistors, having two leads;

a second capacitor having first and second leads, the first lead being connected to a lead of said second circuit, said second lead of said capacitor being connected to said input of said operational amplifier;

a third switch having a control input, a first lead and a second lead, said first lead being connected to said second input of said operational amplifier, said control input of said third switch being connected to said control input of said first switch;

a fourth switch having a control input, a first lead and a second lead, said first lead being connected to said second lead of said third switch, said second lead of said fourth switch being connected to said second lead of said second switch;

a common point of connection of said two resistors of said second resistor circuit being connected to said first lead of said fourth switch and to said second lead of said third switch;

a flip-flop whose set output is connected to said control input of said second switch and to said control input of said fourth switch, the reset output of said flip-flop being connected to said control input of said first switch and to said control input of said third switch, the set input of said flip-flop being connected to said first output of said decoder, the reset input of said flip-flop being connected to said setting output of said control unit; and wherein said instantaneous automatic gain controller further comprises:

an inverter having an input connected to said output of said seismic channels commutator, and an output connected to an inverting input of said amplifier;

a third switch for the commutation of the inverted seismic signal, having a signal input, a control input, and an output, said signal input being connected to an inverting output of said amplifier, said control input being connected to said reset output of said first memory, said output being connected to said lead of said second circuit of said analog memory; and a fourth switch for the commutation of the inverted seismic signal, having a signal input, a control input, and an output, said signal input being connected to said output of said inverter, said control input being connected to said set output of said first memory, said output of said fourth switch being connected to said lead of said second circuit of said analog memory.

* * * * *